US006879484B2

(12) United States Patent
Chou

(10) Patent No.: US 6,879,484 B2
(45) Date of Patent: Apr. 12, 2005

(54) PIVOTAL FRAME FOR FACILITATING REPLACEMENT OF ELECTRONIC DEVICE

(75) Inventor: Chi-Wen Chou, Taipei (TW)

(73) Assignee: First International Computer, Inc., Taipei (TW)

(*) Notice: Subject to any disclaimer, the term of this patent is extended or adjusted under 35 U.S.C. 154(b) by 37 days.

(21) Appl. No.: 10/394,253

(22) Filed: Mar. 24, 2003

(65) Prior Publication Data

US 2004/0190235 A1 Sep. 30, 2004

(51) Int. Cl.[7] ................................................. G06F 1/16

(52) U.S. Cl. ........................ 361/683; 361/679; 361/685

(58) Field of Search ................................. 361/679, 683, 361/685

(56) References Cited

U.S. PATENT DOCUMENTS 5,995,364 A * 11/1999 McAnally et al. .......... 361/685

* cited by examiner

Primary Examiner—Yeah-Hsi Chang
(74) Attorney, Agent, or Firm—Troxell Law Office, PLLC

(57) ABSTRACT

A frame mechanism for facilitating replacement of an electronic device from a computer, which includes a pivotal parallelepiped frame having a mounting side for installing the electronic device (e.g., CD-ROM drive etc.) therethrough. A pivot member of the frame is coupled to a mating pivot member of a parallelepiped cavity provided on the case enabling the frame to be pivotally rotated about the connection of the pivot member and the mating pivot member and enabling first, second, and third engagement members of the frame to be coupled to first, second, and third mating engagement members provided on the cavity while the frame being pivotally rotated, thereby projecting the mounting side of the frame from the cavity to the outside of the computer.

7 Claims, 4 Drawing Sheets

PIVOTAL FRAME FOR FACILITATING REPLACEMENT OF ELECTRONIC DEVICE

FIELD OF THE INVENTION

The present invention relates to a computer case structure and more particularly to a pivotal frame of a computer case for facilitating replacement of an electronic device from the frame.

BACKGROUND OF THE INVENTION

Conventionally, a number of electronic devices (e.g., CD-ROM drive, CD-R, floppy disk drive, etc.) are threadedly secured to a conformed frame in a computer case based on their sizes (e.g., 5¼ inch and 3½ inch). Once the electronic devices being assembled onto the computer, a user can use the electronic devices on the computer.

However, the prior art of driving a plurality of screws to secure the electronic devices to the frame of the computer case suffered from a disadvantage. For example, in case that a replacement of one electronic device due to malfunction or upgrading is needed the user has to detach the frame and an associated panel from the computer case prior to using a screw driver to unfasten the screws one by one at the frame and the electronic device for removing the electronic device. After replacement, the user has to drive the screws one by one to fasten the frame and the electronic device prior to assembling the frame and the panel again. Hence, the replacement procedure is a very tedious and inconvenient one. Further, the user tends to damage the panel during the replacement. Thus, a quick simple replacement is not made possible by the prior art.

In view of the above, the user has to remove the panel from the frame of the computer case prior to replacing the electronic device. It is very inconvenient to user.

Thus, it is desirable to provide a frame which can be quickly pivoted about a computer case without detaching a panel so as to facilitate a replacement of electronic device from the frame and overcome the above drawback of the prior art.

SUMMARY OF THE INVENTION

A primary object of the present invention is to provide a frame mechanism for facilitating replacement of an electronic device from a computer. The frame mechanism comprises a pivotal parallelepiped frame having a mounting side for installing the electronic device (e.g., CD-ROM drive, CD-R, floppy disk drive, etc.) therethrough, a parallelepiped computer case having a parallelepiped cavity, a pivot member provided on the frame being coupled to a mating pivot member provided inside the parallelepiped cavity enabling the frame to be pivotally rotated about the connection of the pivot member and the mating pivot member and enabling a first, second, and third engagement members provided on the frame to be coupled to a first, second, and third mating engagement members provided inside the cavity while the frame being pivotally rotated a predetermined angle, thereby projecting the mounting side of the frame from the cavity to the outside of the computer. By utilizing this, in case that a replacement of one electronic device due to malfunction or upgrading is needed the user simply pivots the frame about the computer case prior to removing the electronic device from the mounting side without detaching a panel. As a result, the above drawback (i.e., uneasy disassembly due to threaded fastening) of the prior art can be overcome.

The above and other objects, features and advantages of the present invention will become apparent from the following detailed description taken with the accompanying drawings.

DETAILED DESCRIPTION OF THE PREFERRED EMBODIMENTS

Figure 1:
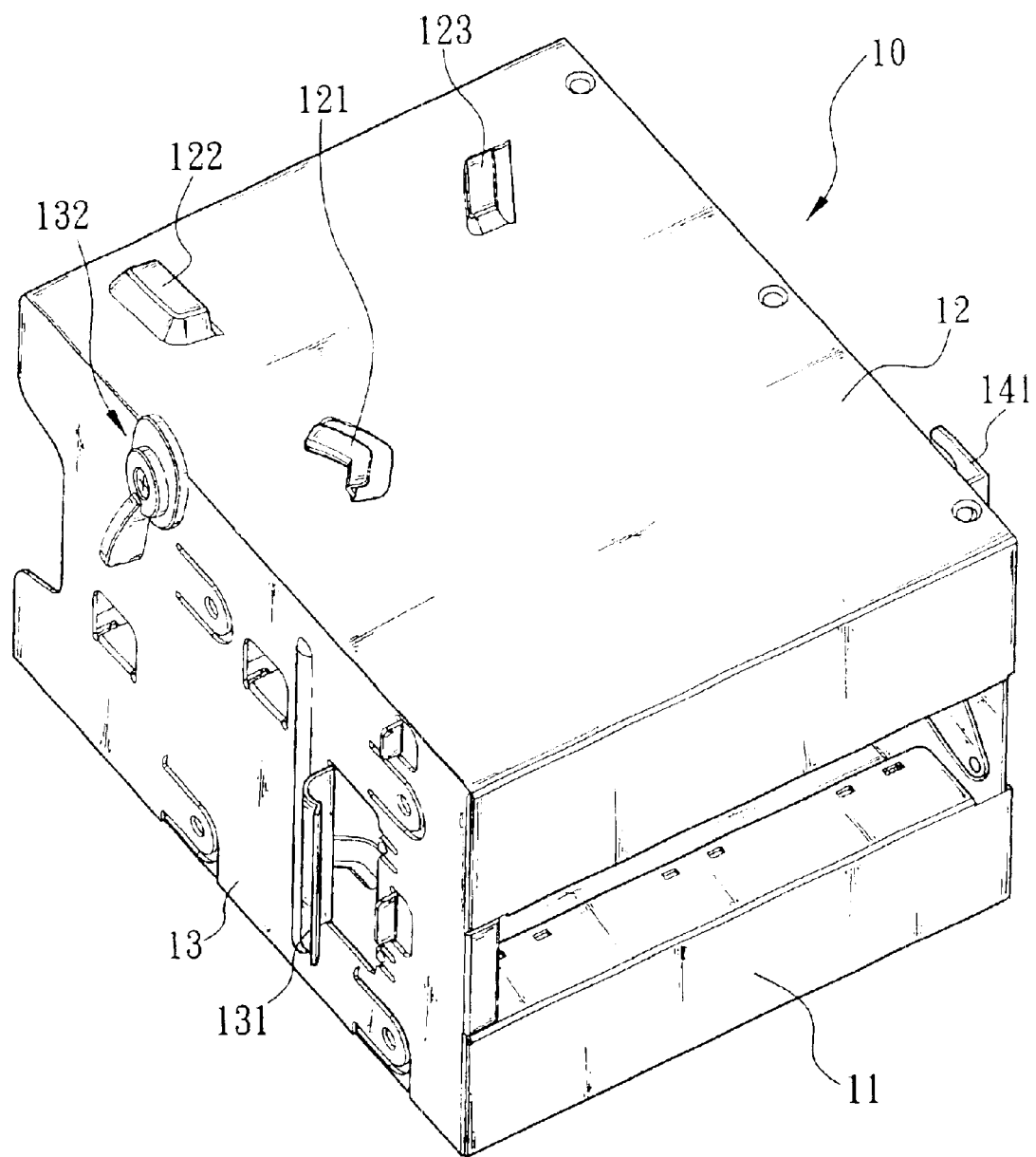
FIG. 1 is a perspective view of a preferred embodiment of pivotal frame for facilitating replacement of electronic device according to the invention.
Figure 2:
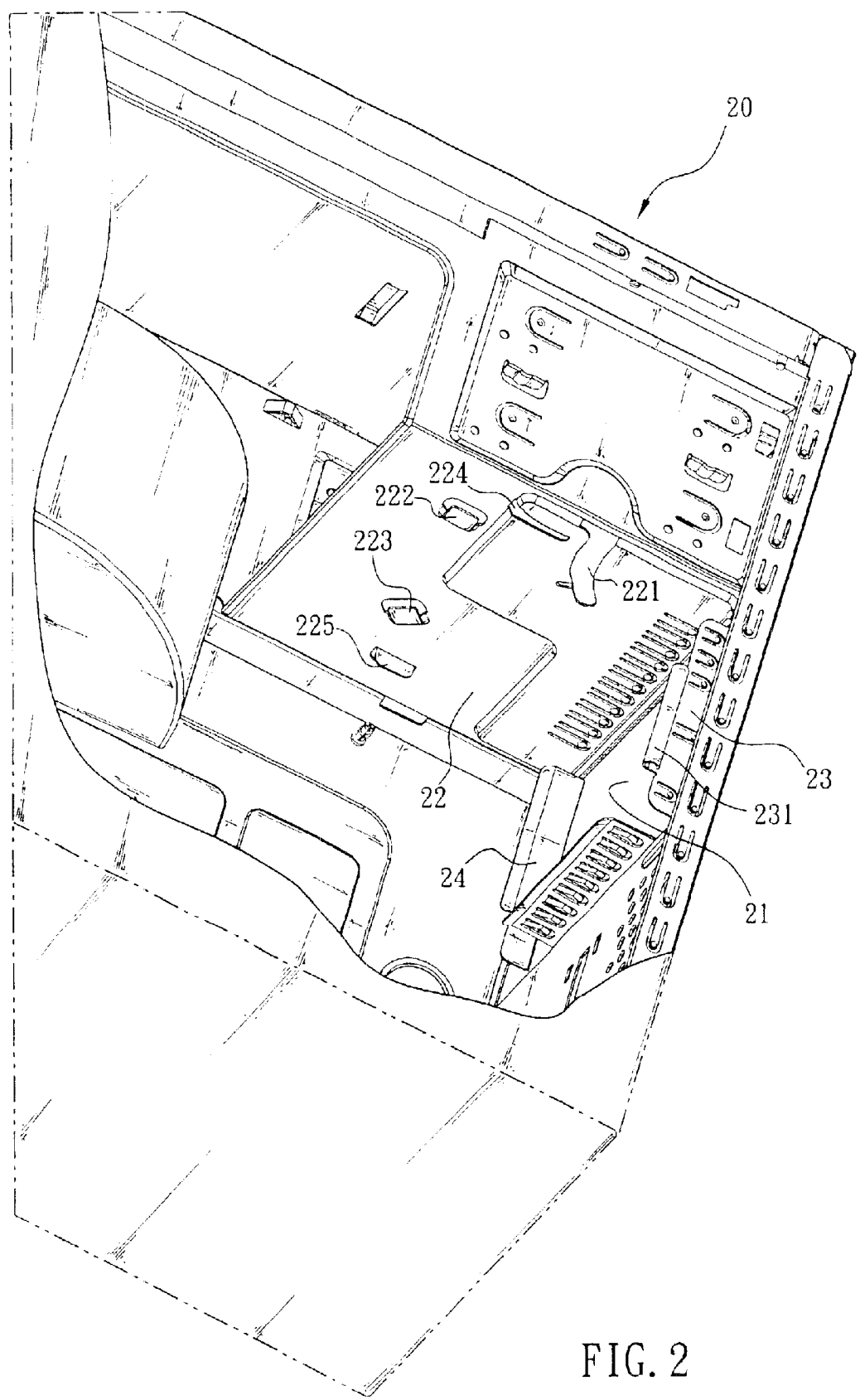
FIG. 2 is a perspective view schematically showing a computer case for receiving the frame shown in FIG. 1.
Figure 3:
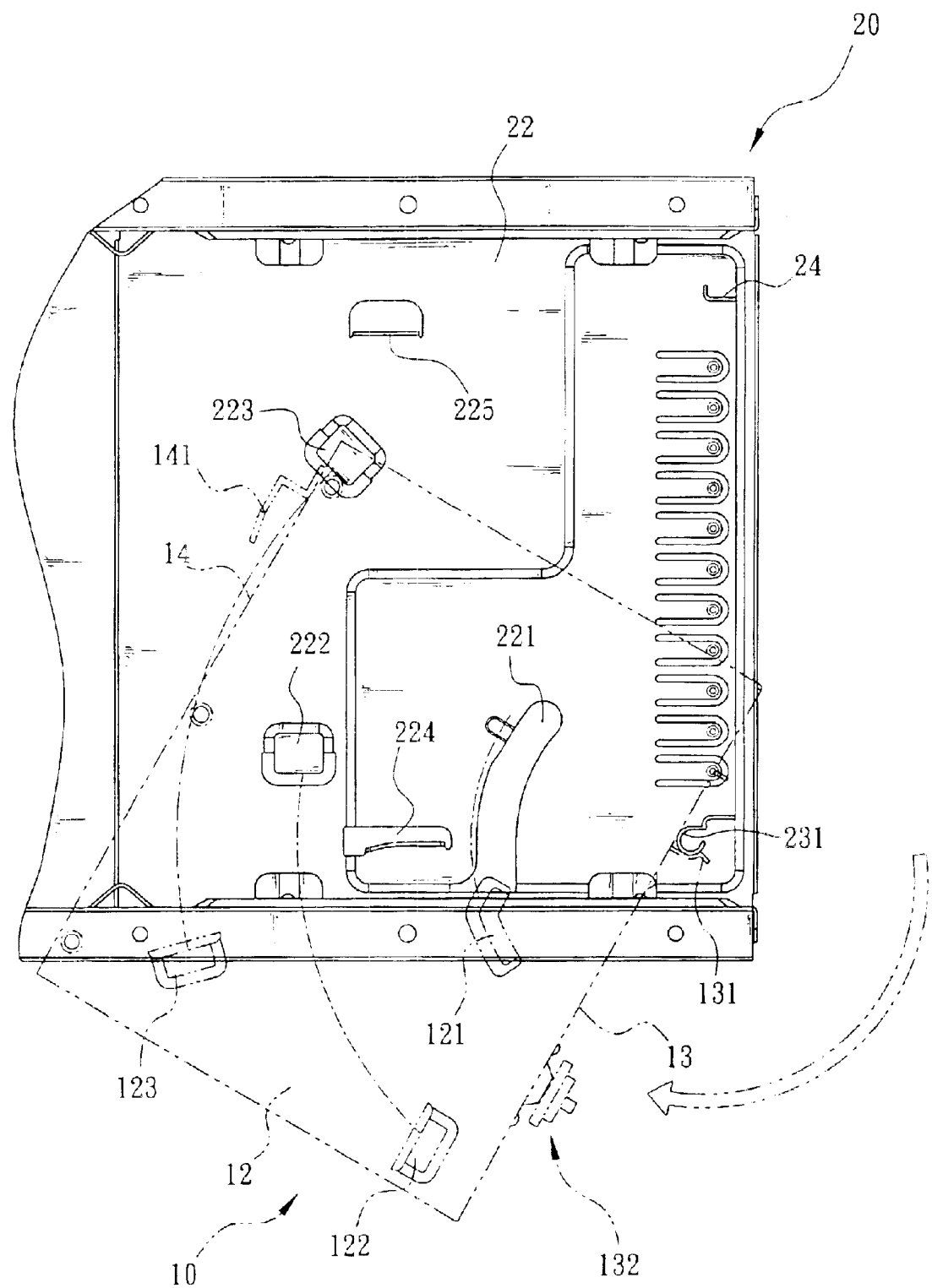
FIG. 3 is a top plan view schematically showing a pivot operation of the frame about the computer case.

Referring to FIGS. 1, 2, 3, and 4, the present invention relates to a pivotal frame of a computer case for facilitating replacement of an electronic device from the frame, which enables a pivotal, parallelepiped frame 10 to be mounted in an inner side of a parallelepiped computer case 20. A plurality of electronic devices (e.g., CD-ROM drive, CD-R, floppy disk drive, etc.) (not shown) can be installed in the frame 10 through a mounting side 11 thereof. The frame 10 comprises a pivot member 131 coupled to a mating pivot member 231 at an inner side of a parallelepiped cavity 21 provided in a side of the computer case 20. As such, the frame 10 can be pivotally rotated about the connection of the pivot member 131 and the mating pivot member 231 (FIG. 3). The frame 10 further comprises a first engagement member 121, a second engagement member 122, and a third engagement member 123 respectively coupled to a first mating engagement member 221, a second mating engagement member 222, and a third mating engagement member 223 at another side of the cavity 21 of the computer adjacent to the mating pivot member 231 by snapping with each other respectively while the frame 10 being pivotally rotated. As such, the mounting side 11 of the frame 10 is projected through the cavity 21 to the outside of the computer. By configuring this, it is possible of quickly removing the electronic device from the frame 10 through the mounting side 11 without detaching a panel or cover (not shown) of the computer.

In the invention, the first engagement member 121, the second engagement member 122, and the third engagement member 123 of the frame 10 are provided on a top side 12 perpendicular to and distal from the mounting side 11 (FIG. 1). Moreover, the pivot member 131 of the frame 10 is provided on a sidewall 13 perpendicular to and proximate the mounting side 11.

In the invention, the cavity 21 is provided at a side of the computer case 20. The cavity 21 is above a bottom of the computer case 20 by a distance (FIG. 2). The first mating engagement member 221, the second mating engagement member 222, and the third mating engagement member 223 are provided at a top side 22 of the cavity 21 and distal from an opening of the cavity 21. Moreover, the mating pivot member 231 is provided on a sidewall 23 perpendicular to the top side 22 of the cavity 21. As such, it is possible of installing the frame 10 in the computer case 20 from a side of the computer case 20 through the cavity 21. Also, the pivot member 131 of the frame 10 is pivotably coupled to the mating pivot member 231 at a side of the cavity 21.

Figure 4:
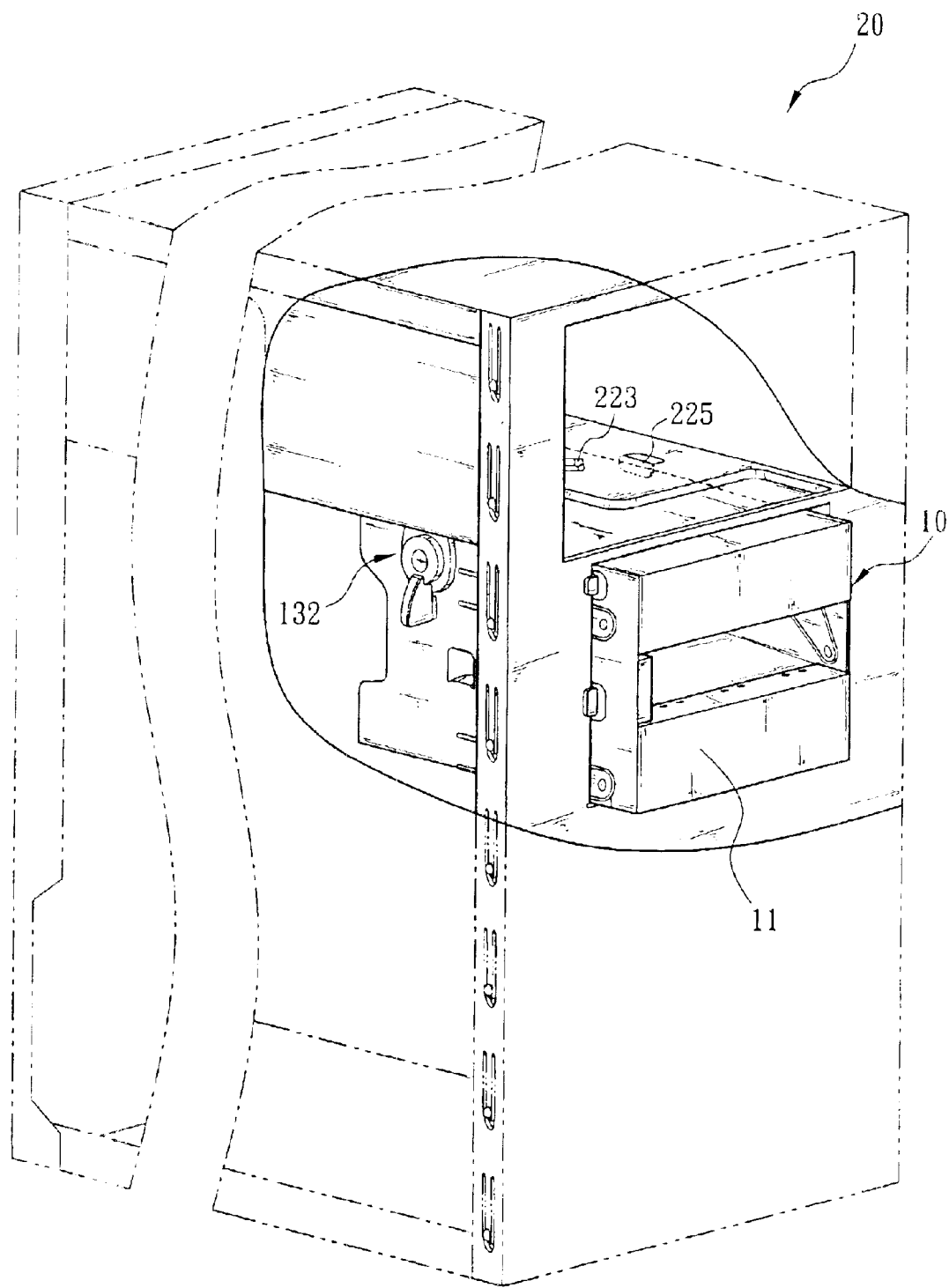
FIG. 4 is a perspective view schematically showing the mounted frame in the computer case.

Hence, the frame 10 can be pivotally rotated a predetermined angle about the connection of the pivot member 131 and the mating pivot member 231 (FIG. 3). Further, the first engagement member 121, the second engagement member 122, and the third engagement member 123 of the frame 10 are respectively coupled to the first mating engagement member 221, the second mating engagement member 222, and the third mating engagement member 223 at another side of the cavity 21 by snapping with each other during the frame 10 being pivotally rotated. As a result, the mounting side 11 of the frame 10 is projected from the cavity 21 to the outside of the computer (FIG. 4).

In the invention, a pivotal snapping piece 132 is formed at the sidewall 13 of the frame 10 proximate the top side 12 of the frame 10 (FIGS. 1, 2, and 3). The snapping piece 132 is disposed corresponding to a snapping member 224 at an edge of the cavity 21 when the first engagement member 121, the second engagement member 122, and the third engagement member 123 of the frame 10 are snapped into the first mating engagement member 221, the second mating engagement member 222, and the third mating engagement member 223 of the computer case 20 respectively. Hence, it is possible of pivoting the snapping piece 132 for snapping into the snapping member 224 so as to fasten the frame 10 in the cavity 21.

In a preferred embodiment of the invention, the first engagement member 121 is a hook and each of the second engagement member 122 and the third engagement member 123 is a tab all raised above the top side 12 of the frame 10. The pivotal snapping piece 132 is a latch. The snapping member 224 at an edge of the cavity 21 is a through hole. The first mating engagement member 221 is a groove extended inward from a sidewall thereof and terminated at a lower flat surface. Each of the second mating engagement member 222 and the third mating engagement member 223 is a raised bent piece. The pivot member 131 and the mating pivot member 231 are elongate hooks capable of matingly coupling together.

In assembling the invention, first directly snap the raised hook of the first engagement member 121 into the groove of the first mating engagement member 221 from the side of the computer case 20 by visually aligning. Further, pivot the frame 10 about the connection of the pivot member 131 and the mating pivot member 231. As an end, the second engagement member 122 and the third engagement member 123 can be easily snapped into the second mating engagement member 222 and the third mating engagement member 223 for fastening.

In the invention, a plurality of elastic pieces 141 are formed on the other sidewall 14 of the frame 10 proximate the mounting side 11 (FIGS. 1, 2 and 3). The elastic pieces 141 are urged against the other sidewall 24 of the cavity 21 when the frame 10 is installed in the cavity 21. As such, an interference of electromagnetic wave can be avoided. Moreover, a positioning member 225 is provided at the top side 22 of the cavity 21 proximate the third mating engagement member 223. The positioning member 225 is able to position the frame 10 in the cavity 21.

In brief, in case that a replacement of one electronic device due to malfunction or upgrading is needed the user simply pivots the frame 10 about the computer case 20. Next, removes the electronic device from the mounting side 11 directly for replacement. As such, the electronic device can be quickly removed from the computer case for replacement without detaching a panel or a cover on the computer. As a result, the above drawback (i.e., threaded fastening) of the prior art can be overcome.

While the invention has been described by means of specific embodiments, numerous modifications and variations could be made thereto by those skilled in the art without departing from the scope and spirit of the invention set forth in the claims.

What is claimed is:

1. A frame mechanism for facilitating replacement of an electronic device from a computer comprising:

a pivotal, parallelepiped frame comprising a mounting side for installing the electronic device therethrough, a first engagement member on a top side thereof perpendicular to and distal from the mounting side, a second engagement member on the top side thereof, a third engagement member on the top side thereof, and a pivot member on a sidewall thereof perpendicular to and proximate the mounting side; and a parallelepiped computer case comprising a parallelepiped cavity above a bottom thereof by a distance, a first mating engagement member on a top side thereof perpendicular to and distal from an opening of the cavity, a second mating engagement member on the top side thereof, a third mating engagement member on the top side thereof, and a mating pivot member on a sidewall of the cavity perpendicular to the top side of the cavity, wherein, while the frame being mounted inside the computer case through the cavity, the pivot member of the frame and the mating pivot member of the cavity are pivotally coupled together enabling the frame to pivot about the connection of the pivot member and the mating pivot member, and the first engagement member, the second engagement member, and the third engagement member of the frame are respectively snapped to the first mating engagement member, the second mating engagement member, and the third mating engagement member while the frame being pivotally rotated a predetermined angle, thereby projecting the mounting side of the frame from the cavity to the outside of the computer, wherein the frame further comprises a pivotal snapping piece at the sidewall thereof proximate the top side thereof, and further comprising a snapping member at an edge of the cavity, the snapping member being disposed corresponding to the snapping piece when the first engagement member, the second engagement member, and the third engagement member of the frame are snapped into the first mating engagement member, the second mating engagement member, and the third mating engagement member of the computer case respectively so that the snapping piece is capable of pivoting for snapping into the snapping member, thereby fastening the frame in the cavity.

2. The frame mechanism of claim 1, wherein the first engagement member is a hook and each of the second engagement member and the third engagement member is a tab all raised above the top side of the frame.

3. The frame mechanism of claim 1, wherein the pivotal snapping piece is a latch and the snapping member at the cavity is a through hole.

4. The frame mechanism of claim 1, wherein the first mating engagement member is a groove extended inward from a sidewall thereof to terminate at a lower flat surface and each of the second mating engagement member and the third mating engagement member is a raised bent piece.

5. The frame mechanism of claim 1, wherein the pivot member and the mating pivot member are elongate hooks capable of matingly coupling together.

6. The frame mechanism of claim 1, further comprising a positioning member at the top side of the cavity proximate the third mating engagement member, the positioning member being capable of positioning the frame in the cavity.

7. A frame mechanism for facilitating replacement of an electronic device from a computer comprising:

a pivotal, parallelepiped frame comprising a mounting side for installing the electronic device therethrough, a first engagement member on a top side thereof perpendicular to and distal from the mounting side, a second engagement member on the top side thereof, a third engagement member on the top side thereof, and a pivot member on a sidewall thereof perpendicular to and proximate the mounting side; and a parallelepiped computer case comprising a parallelepiped cavity above a bottom thereof by a distance, a first mating engagement member on a top side thereof perpendicular to and distal from an opening of the cavity, a second mating engagement member on the top side thereof, a third mating engagement member on the top side thereof, and a mating pivot member on a sidewall of the cavity perpendicular to the top side of the cavity, wherein, while the frame being mounted inside the computer case through the cavity, the pivot member of the frame and the mating pivot member of the cavity are pivotally coupled together enabling the frame to pivot about the connection of the pivot member and the mating pivot member, and the first engagement member, the second engagement member, and the third engagement member of the frame are respectively snapped to the first mating engagement member, the second mating engagement member, and the third mating engagement member while the frame being pivotally rotated a predetermined angle, thereby projecting the mounting side of the frame from the cavity to the outside of the computer, wherein the frame further comprises a plurality of elastic pieces on the other sidewall thereof proximate the mounting side, the elastic pieces being urged against the other sidewall of the cavity when the frame is installed in the cavity, thereby avoiding an interference of electromagnetic wave from occurring.

* * * * *